United States Patent
Friedman

[19]

[11] Patent Number: 6,127,938
[45] Date of Patent: Oct. 3, 2000

[54] ADJUSTABLE SHIELD FOR VEHICLE MOUNTED TOLL COLLECTION IDENTIFIER

[75] Inventor: Solomon Friedman, Brooklyn, N.Y.

[73] Assignee: Privacy Shield L.L.C., Brooklyn, N.Y.

[21] Appl. No.: 09/268,133

[22] Filed: Feb. 12, 1999

[51] Int. Cl.[7] .................................................. G08B 23/00
[52] U.S. Cl. ...................... 340/693.6; 340/904; 340/933; 340/905; 340/825.34; 340/825.54; 342/44; 206/720
[58] Field of Search ........................... 340/693.6, 825.54, 340/933, 904, 905, 825.34; 342/44; 206/720

[56] References Cited

U.S. PATENT DOCUMENTS

| | | | |
|---|---|---|---|
| Re. 32,772 | 10/1988 | Hawley | 264/108 |
| 3,231,854 | 1/1966 | Gran | 340/928 |
| 4,227,037 | 10/1980 | Layton | 174/35 MS |
| 4,312,917 | 1/1982 | Hawley | 428/375 |
| 4,325,146 | 4/1982 | Lennington | 359/155 |
| 4,401,216 | 8/1983 | Koch | 206/759 |
| 4,567,317 | 1/1986 | Ehrlich et al. | 174/35 MS |
| 5,097,885 | 3/1992 | Kitagawa | 160/84.01 |
| 5,097,949 | 3/1992 | Heldwein | 206/720 |
| 5,196,846 | 3/1993 | Brockelsby et al. | 340/10.51 |
| 5,310,999 | 5/1994 | Claus et al. | 235/384 |
| 5,483,423 | 1/1996 | Lewis et al. | 361/816 |
| 5,485,520 | 1/1996 | Chaum et al. | 705/74 |
| 5,530,702 | 6/1996 | Palmer et al. | 370/445 |
| 5,557,279 | 9/1996 | D'Hont | 342/42 |
| 5,565,857 | 10/1996 | Lee | 340/825.34 |
| 5,602,919 | 2/1997 | Hurta et al. | 705/65 |
| 5,677,511 | 10/1997 | Taylor et al. | 174/52.2 |
| 5,726,867 | 3/1998 | Zarreii | 361/818 |
| 5,734,343 | 3/1998 | Urbish et al. | 340/942 |
| 5,761,054 | 6/1998 | Kuhn | 361/818 |
| 5,767,789 | 6/1998 | Afzali-Ardakani et al. | 340/10.1 |

*Primary Examiner*—Benjamin C. Lee
*Attorney, Agent, or Firm*—Abelman, Frayne & Schwab

[57] ABSTRACT

A holder is provided for the reception and selective shielding of an electronic vehicle identifying device conventionally used in conjunction with automatic toll collection. The holder includes a shielding portion which is manually actuated by the vehicle operator when it is desired to permit communication between the signal of the vehicle identifying transponder and an externally located interrogator which ascertains the presence of the vehicle.

15 Claims, 6 Drawing Sheets

ADJUSTABLE SHIELD FOR VEHICLE MOUNTED TOLL COLLECTION IDENTIFIER

FIELD OF INVENTION

The present invention relates to an adjustable shield for a vehicle-mounted toll collection identifier. The adjustable shield is manually actuated by the vehicle operator to control whether the vehicle identifying device will either be shielded from, or may be in communication with, the associated antenna at the toll collection station.

BACKGROUND OF THE INVENTION

Various automatic toll collection systems have been proposed to reduce the dependence on a manual attendant for the collection of tolls that the vehicle operator must present at toll collecting locations. It has been known for some time to provide special tokens which the vehicle's operator may deposit at the toll station without manual intervention, with the deposit and subsequent processing of the token providing the vehicle with a signal that it may pass through the toll collecting location. Such a system disadvantageously requires the vehicle's operator to periodically buy a supply of such tokens which are generally only usable at the selling facility. More recently, individually coded electronic transponders are being supplied for mounting to the vehicle. One such system, known as the E-Z PASS is coded to provide an electronic signal unique to a particular vehicle. The vehicle owner obtains the transponder device from the appropriate authority. The transponder is typically mounted on the windshield of the vehicle, and emits a signal which identifies that particular vehicle. As the vehicle approaches the toll station, an antenna located at the toll station ascertains the presence of the vehicle and will debit the appropriate toll to the vehicle's operator's account which has been established at the time the vehicle operator obtains the vehicle-mounted transponder from the toll collection authority. The balance of the vehicle operator's account may either be periodically replenished by electronic deposit, the forwarding of check drafts to the toll collection authority, or periodic debiting to the vehicle operator's general charge account. This toll collection system advantageously simplifies the process of collecting tolls, speeds up traffic flow through the toll station, and reduces the cost of collecting tolls by dispensing with the need to have an attendant at the toll station to make the currency exchange with the vehicle's operator. However, because of the continued presence of the transponder in an activated mode within the vehicle, there may be situations when the vehicle operator prefers not to emit the signal. For example, the operator may want to pay a particular toll with currency rather than have it automatically debited to the account set up in association with the transponder. Further the ability to ascertain the identification of the transponder at a location other than the toll station could subject the transponder to improper cloning, or be the basis for privacy concerns. Accordingly, it would be preferable to limit the activation of the transponder to those situations in which the vehicle operator is passing is through the toll station and desires to utilize the transponder for the automatic toll collection.

SUMMARY OF THE INVENTION

The present invention advantageously provides a holder for the reception and selective shielding of the electronic vehicle identifying transponder. It includes a housing which includes a container for the vehicle identifying device, with the housing including at least a portion constructed of a shielding material which prevents the transmission of electronically generated signals. A manually operable translation means is provided to selectively move the shielding material portion of the housing between first and second positions. In one of the positions, the shielding material overlies the signal emitting area of the vehicle identifying transponder to prevent the electronic signal of the transponder from being transmitted outside of the vehicle.

In the other of its positions, the shielding material is moved so as not to block the external transmission of the electronic signal. Thus, by the selected manual operation of the shield, the user can determine when the vehicle mounted transponder can be externally interrogated to ascertain the presence, and time, that the vehicle is at a particular location.

Several embodiments are disclosed in the present invention. According to one embodiment the transponder is located within a drawer of a housing member that is attached to the vehicle. Such attachment may typically be to the windshield of the vehicle. The drawer is normally in the closed position with the housing being formed of material to shield the transponder from a signal being transmitted thereto by an interrogating antenna or other device. As the vehicle passes through the toll station, and when the vehicle's operator desires to activate the transponder, the drawer will be opened with respect to its housing, such that the appropriate portion of the transponder will no longer be shielded. After passing through the toll station the drawer may then be moved back to the closed condition to shield the transponder.

In accordance with another embodiment of the present invention, the transponder is stationary within the housing. The housing includes a sliding shield, which may typically be a planar member, which normally overlies the transponder, but may be manually moved away from its overlying position when the vehicle is at the toll station and it is desired to utilize the transponder for the automatic payment of the toll.

Additional embodiments are provided where the transponder housing may be mounted to the visor, roof, or external of the vehicle. Where the transponder housing is mounted external to the vehicle, a manually controlled switch is provided for the vehicle's operator to displace the shielding portion of the transponder holder, such that the transponder may be utilized for the automatic collection of the toll.

It is therefore seen that the present invention provides a manually operable shield for use in conjunction with a vehicle-mounted identifying device which will permit the vehicle's operator to determine when the transponder allows external identification of the vehicle.

It is therefore a primary object of the present invention to provide a holder for the reception and selective shielding of an electronic vehicle identifying device.

A further object of the invention is to provide such a holder which includes a manually operable sliding portion, which permits the vehicle's operator to selectively shield the vehicle identifying device from external identification.

Another object of this invention is to provide such a holder in which the electronic vehicle identifying device transmits a signal unique to this particular vehicle, and the shielded holder selectively prevents the signal from being transmitted external of the vehicle.

Yet an additional object of the present invention is to provide such a holder which is in the form of a housing, having a drawer which contains the vehicle identifying device, with the drawer being manually open when it is desired to utilize the vehicle identifying device for toll payment.

These as well as other objects of the present invention will become apparent upon a description of the following drawings.

BRIEF DESCRIPTION OF THE DRAWINGS

FIGS. 6–8 show a second embodiment of the present invention which may be carried by the visor of the vehicle. In FIGS. 6 and 7 the vehicle identifying transponder is inserted within the holder, with it being shielded in FIG. 6, and non-shielded in FIG. 7.

DETAILED DESCRIPTION OF THE PREFERRED EMBODIMENTS

Reference is initially made to the embodiment shown in FIGS. 1–5. Vehicle V is provided with an automatic toll collection transponder 10 with one such transponder being known as the E-Z PASS for automatic toll collection on roads and bridges. The transponder will emit a vehicle identifying signal. When vehicle V goes through a toll collection booth (not shown) the signal emitted by transponder 10 will be received by a suitable compatible apparatus at the toll collection location to ascertain that vehicle V has passed through the toll collection location. This information is then transmitted to a central computer system in the well-known manner and the owner of vehicle V, who has obtained the transponder from the toll collection authority, will have his or her account debited for the appropriate toll.

Although the present invention is being described in conjunction with the E-Z PASS collection system, it should be naturally understood that other transponders having the same or similar shape may be used in conjunction with the shielded holder of the present invention.

Transponder 10 may be provided with attachment elements 12 which are intended to mate with attachment elements 14 which, in the absence of the present invention, may be mounted to the windshield W of vehicle V. In accordance with the present invention, the holder 20 is interposed between transponder 10 and the vehicle windshield W. Holder 20 includes main housing member 22 and slidable drawer member 24. The main housing member 22 includes channels 26 to guide the sliding movement of drawer 24 between the conditions shown in FIGS. 2 and 4. A stop member 28 is provided at the end open extreme of housing member 22 which cooperates with depending projection 30 at the bottom of drawer 24 to limit the outward movement of drawer 24, thereby preventing drawer 24 from falling out of the housing member 22. A handle 32 is preferably provided on drawer 24 to facilitate the manual movement thereof between the positions shown in FIGS. 2 and 4. Securement elements 34 are provided on the drawer member 24 for complementary engagement with the securement elements 12 on the bottom of the transponder. Securement elements 34 may correspond to securement elements 14 which are attached to the windshield W of the vehicle. Similarly, securement elements 36 are provided at the lower portion of the housing for engagement with securement elements 14 mounted on the windshield. Securement elements 36 may preferably be similar to securement elements 12 on the bottom of the transponder 10. Thus, should it be desired not to use the shielded housing 20, the transponder 10 may be removed therefrom and directly attached to the securement elements 14 on the vehicle windshield.

Housing member 22 will be constructed of a material capable of shielding the signal emitted by transponder 10. While various materials may be utilized, a particularly advantageous structure is molded of plastic having shielding properties, such as disclosed in U.S. Pat. No. 4,312,917 and Re 32772. It should naturally be understood that other materials may be used, for example, housing 22 could be formed of metal having the appropriate shielding properties while drawer 24 need not be formed of shielding material. It may, for purposes of aesthetic compatibility, be molded of the same material forming housing member 22.

Drawer 24 provides a manually operable translation means for selectively moving the transponder 10 between two positions with respect to the shielding portion of housing 22 which overlies the transmitting region of transponder 10. In the condition shown in FIG. 2, the drawer 24 is fully inserted within housing member 22, such that the shielding material forming housing member 22 will prevent transmission of the vehicle identifying signal between the transponder 10 and an external interrogator. When the drawer 24 is manually moved to the condition shown in FIG. 4, housing member 22 will no longer provide shielding thereof. Further, even if drawer 24 is formed of a shielding material, its central opening 25 provides access between the external interrogator and the signal emitted by the transponder 10. Accordingly it should be appreciated that when it is desired to permit the transponder 10 to communicate with an external interrogator, and therefore indicate the presence of vehicle V, the operator grasps handle 32 and slides the drawer 24 to the condition shown in FIG. 4. This is typically done when the vehicle approaches the toll collection station and the operator desires that the toll be debited to his or her account. After passing through the toll collection station the drawer may then be moved back to the condition shown in FIG. 3.

Figure 1:
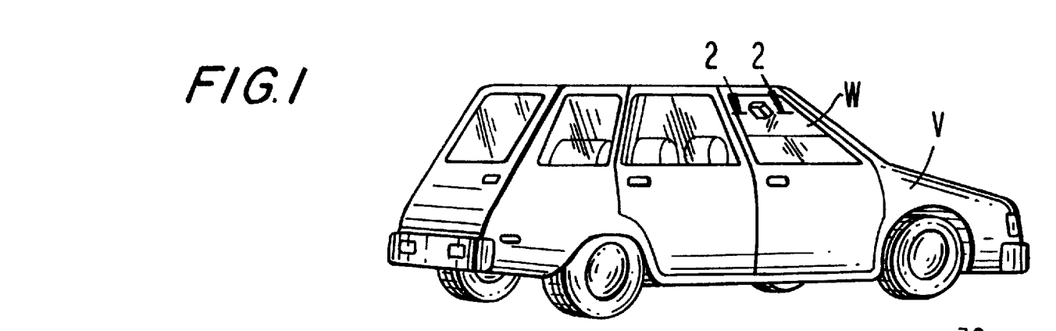
FIG. 1 shows a vehicle with a first embodiment of the present invention mounted on the upper central portion of the windshield.
Figures 2, 4:
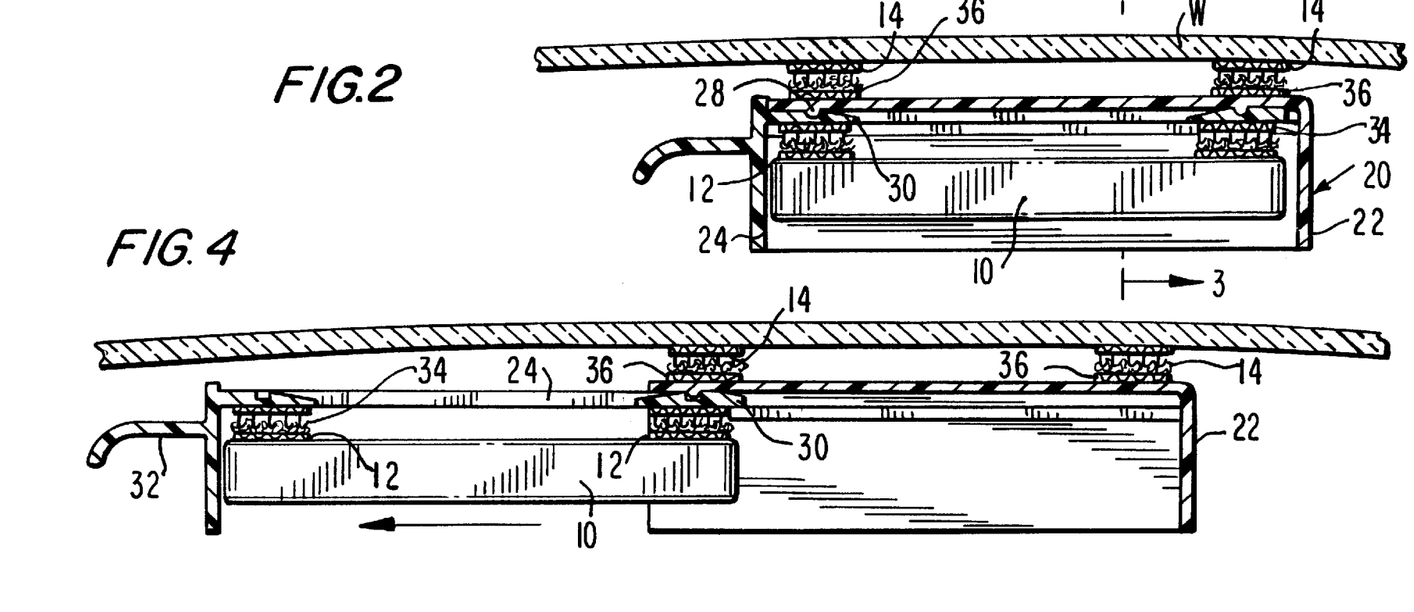
FIG. 2 is a cross-sectional view along the line 2—2 as shown in FIG. 1, looking in the direction of the arrows, and showing the transponder in its shielded, non-activated condition.
FIG. 4 corresponds to FIG. 2, but shows the transponder moved to its non-shielded, activated condition.
Figures 3, 5:
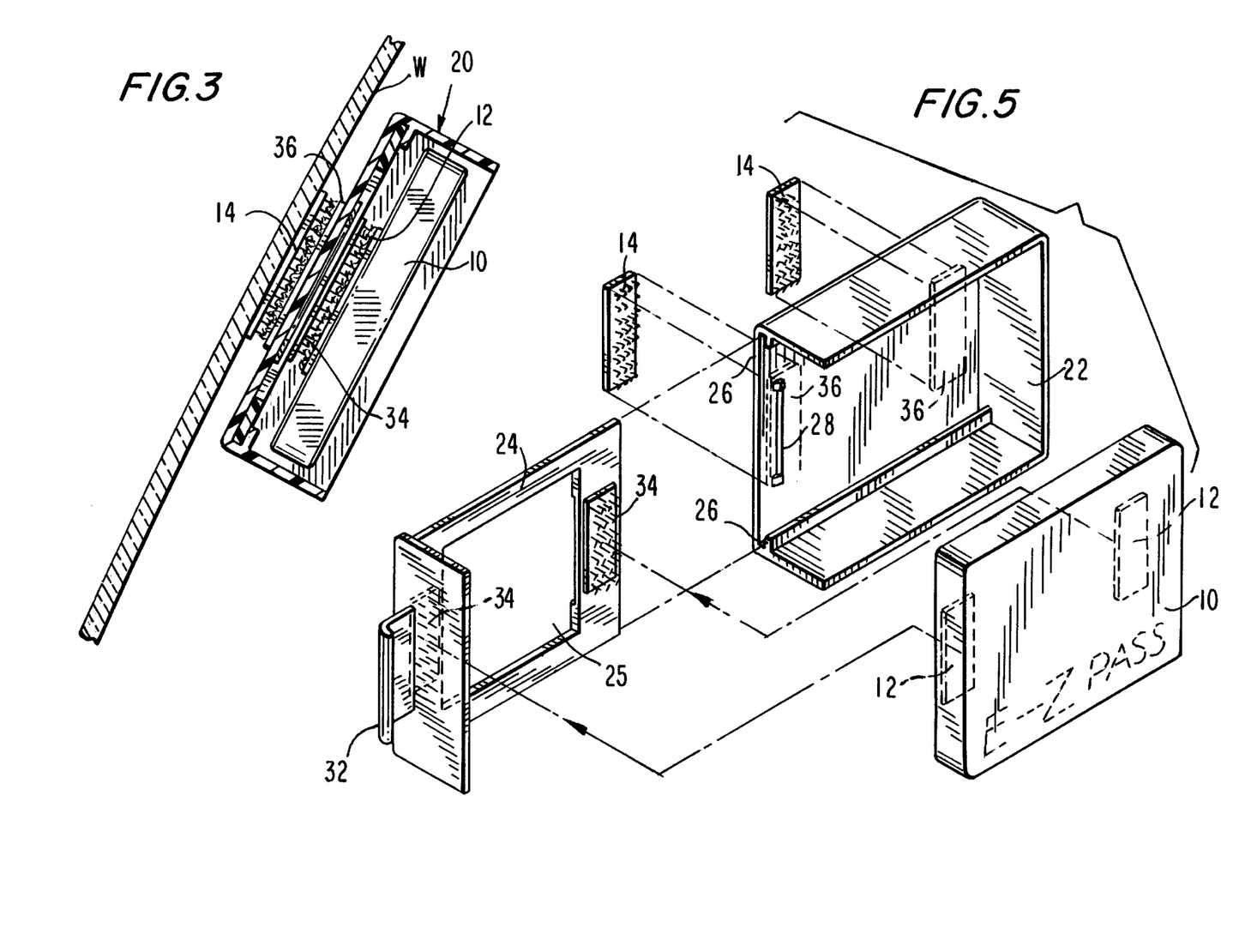
FIG. 3 is a cross-sectional view along the line 3—3 as shown in FIG. 2, and looking in the direction of the arrows.
FIG. 5 is an exploded perspective view of the components forming the embodiment shown in FIGS. 1–4.
Figure 6:
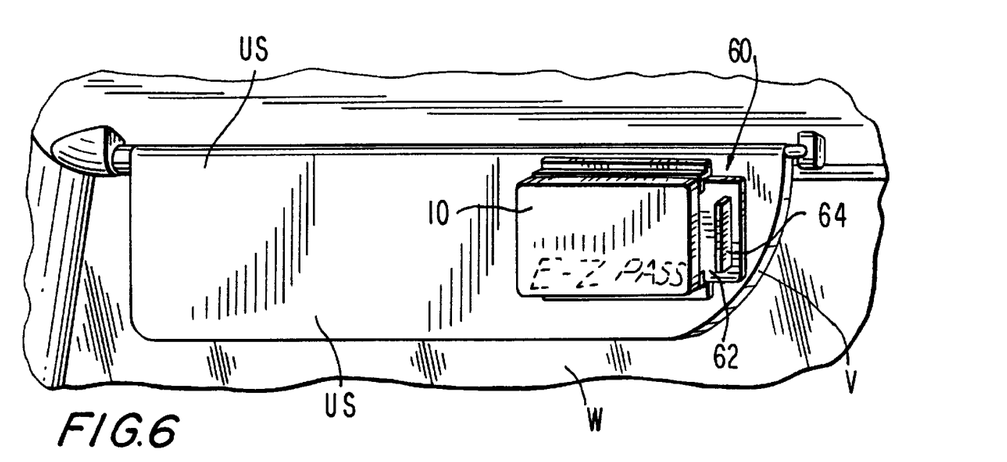
Figure 7:
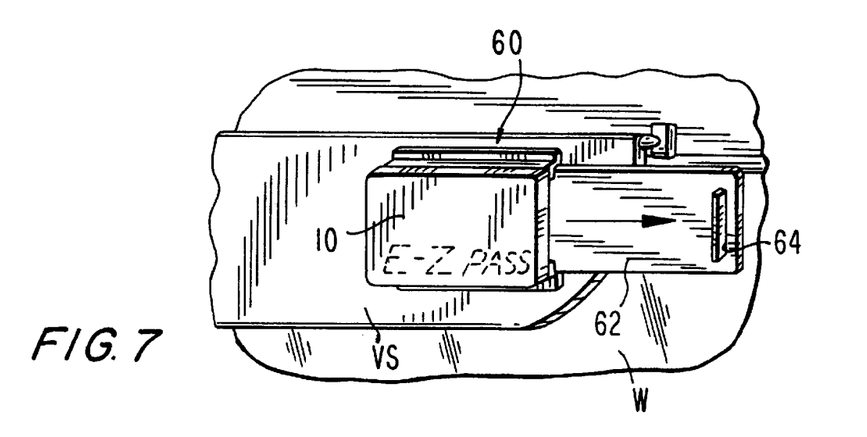
Figure 8:
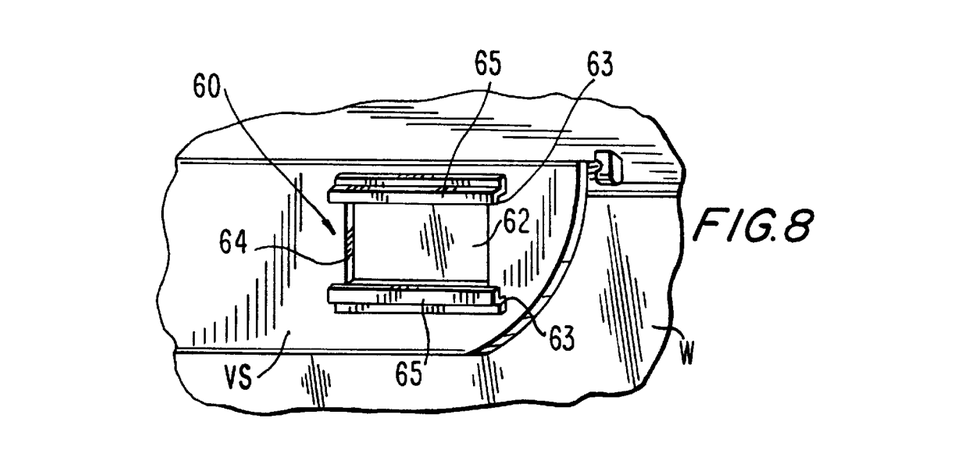
FIG. 8 shows the mounted holder without the transponder.

Reference is now made to FIGS. 6–8 which show an alternative embodiment of the selectively shielding holder 60 for the transponder 10. Holder 60 is shown mounted to the visor VS. Transponder 10 may be connected to its opposed planar surfaces 65 as by an adhesive, not shown. The vehicle mounted portion of the holder 60 includes opposed channels 63 for the reception of a slidable shield member 62, having a handle 64, which is provided in overlying relationship with respect to the signal transmitting portion of transponder 10. When shielding member 64 is in the position shown in FIG. 6, it will prevent communication between the transponder 10 and an externally located interrogator. Conversely, when the shielding member 62 is manually moved to the position shown in FIG. 7, it will no longer block the transmission of the vehicle identification signal between transponder 10 and the external interrogator.

Thus, according to the embodiments shown in FIGS. 6–8, the transponder 10 remains stationary and establishment of the two operative conditions is determined by movement of the planar slidable shielded member 62 between the positions shown in FIGS. 6 and 7.

Figure 9:
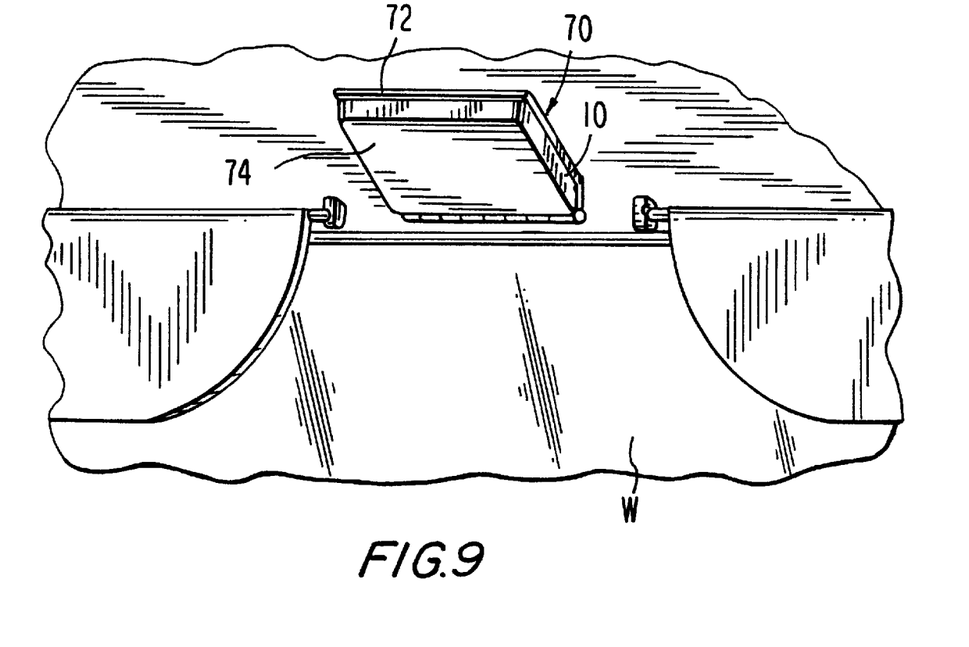
FIGS. 9 and 10 show a third embodiment of the present invention which may be mounted to the roof of the vehicle. The transponder is shielded in FIG. 9 and non-shielded in FIG. 10.
Figure 10:
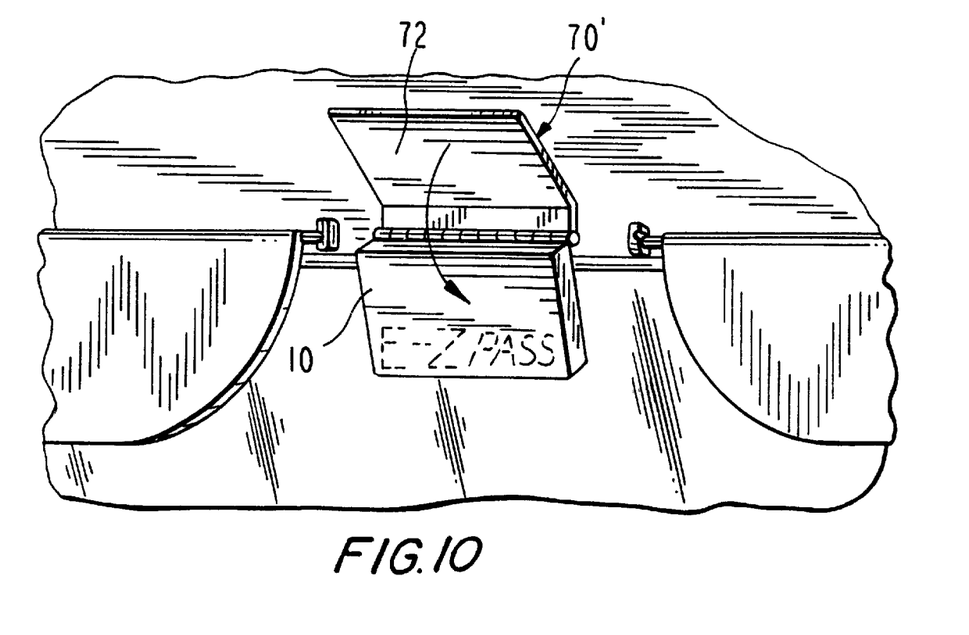

Reference is now made to FIGS. 9 and 10 which show still a further embodiment of the present invention in which the shielded housing 70 may be attached to the roof portion of the vehicle, immediately adjacent the windshield W. Housing 70 is formed of a shielding material, which may be similar to the material of housing 22 and slide members 62 shown in the prior embodiments. It includes a first portion 72 which is appropriately connected to the roof of the vehicle as by an adhesive (not shown) and portion 74 pivotally connected thereto. Portion 74 includes the transponder 10. In the condition shown in FIG. 9 the transponder 10 will be shielded by portion 72, thereby preventing communication between its vehicle identifying signal and an external interrogator. When the portion 74 is pivoted to the condition shown in FIG. 10, the transponder will no longer be shielded, permitting vehicle identification communication with the external interrogator.

Figure 11:
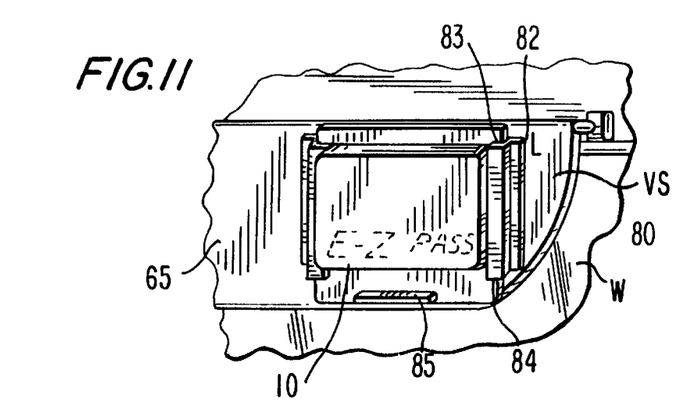
FIGS. 11 and 12 show still a further embodiment of the present invention, which may be mounted to the visor, with the transponder being shielded in FIG. 11 and non-shielded in FIG. 12.
Figure 12:
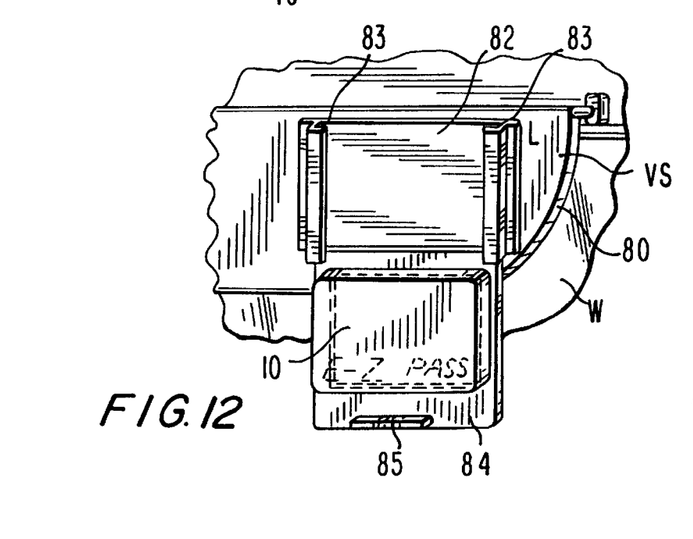

Reference is now made to FIGS. 11 and 12 which show still a further embodiment of the present invention which includes a shielded housing 80 intended to be mounted in visor VS of the vehicle. Housing 80 includes members 82 and 84. At least member 82 is constructed of a shielding material. Member 82 is appropriately mounted to visor VS as by an adhesive (not shown). Member 82 includes channels 83 for the sliding movement of planar member portion 84 between the conditions shown in FIGS. 11 and 12. A handle 85 is provided at the free end of 84 for manual movement between these two positions. The transponder 10 may be connected to member 84 by elements similar to 12 and 34 of FIG. 5 (not shown). Thus, when a planar drawer-like member 84 is in the condition shown in FIG. 11, the transponder 10 will be shielded. Manual movement thereof to the condition shown in FIG. 12 permits communication between transponder 10 and the internal interrogator.

Figure 13:
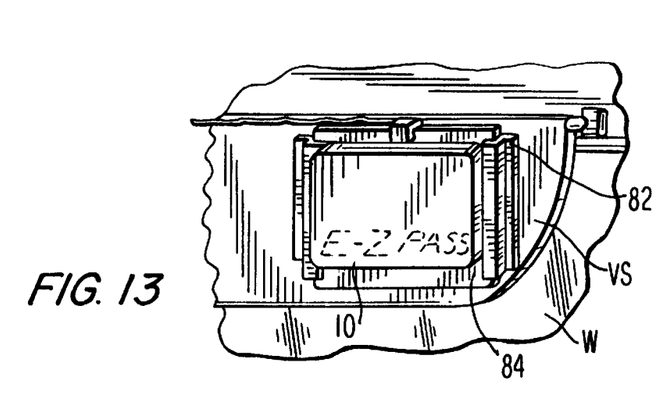
FIGS. 13 and 14 show a modification of the embodiment shown in FIGS. 11 and 12 wherein a push button is provided to move the transponder to its non-shielded position.
Figure 14:
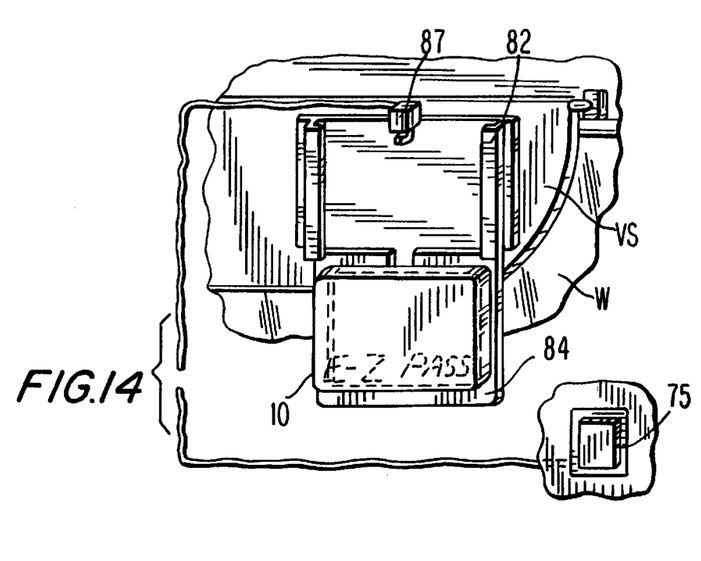

Reference is now made to FIGS. 13 and 14 which generally correspond to the embodiment shown in FIGS. 11 and 12, except that movement to the condition shown in FIG. 14 is provided by a manual push button 75. Upon the actuation of push button 75, catch 87, now carried by housing 82 is released from its cooperating engagement with planar drawer-like member 84 to permit movement thereof to the condition shown in FIG. 14.

Figure 15:
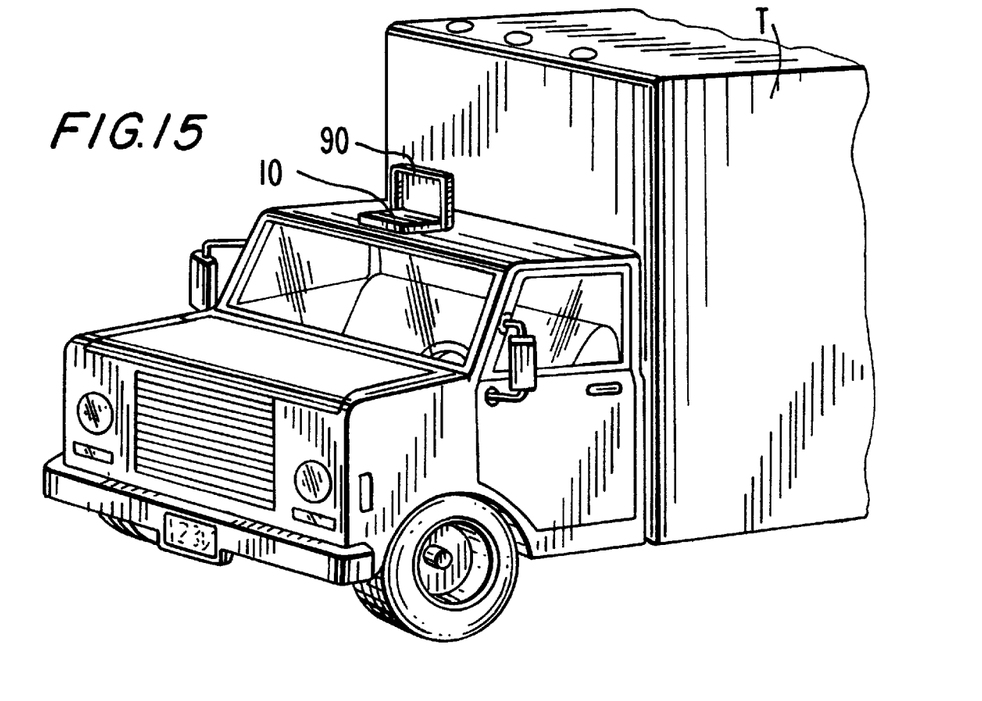
FIGS. 15 and 16 show further embodiments of the present invention in which the shielded housing member may be mounted to an external region of the vehicle.
Figure 16:
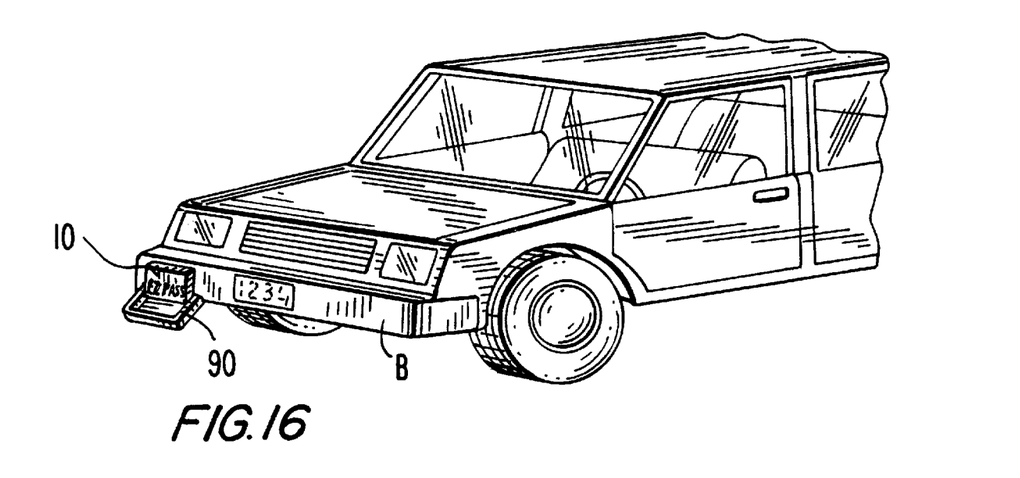

Reference is now made to FIGS. 15 and 16 which show still further embodiments of the present invention in which the transponder is externally mounted to either the top of the cab of a truck T or bumper B of a vehicle. Housing 90 will normally be in a closed condition to thereby shield the transponder 10. A push button device within the vehicle (not shown) suitably opens the housing 90 to the condition shown in FIGS. 15 or 16 when it is desired to permit communication between the transponder 10 and the external interrogator. This would typically be done while passing through the toll gate. Appropriate mechanism is also provided to close the housing 90 after the toll has been processed.

Accordingly the present invention has been described in conjunction with several embodiments which are provided for illustrative purposes only, with it being understood that the invention is defined by the following claims:

I claim:

1. A holder for the reception and selective shielding of an electronic vehicle identifying device, comprising:

a housing forming a container for the vehicle identifying device, at least a portion of the housing constructed of a shielding material which provides shielding of electronically generated signals, and manually operable translation means for selectively moving said shielding material portion of the housing between first and second positions relative to the vehicle identifying device, said first position characterized as said shielding material portion overlying the vehicle identifying device to prevent external electronic signal transmission with the vehicle identifying device and said second position displacing said shielding material portion from the vehicle identifying device to permit external electronic signal transmission with the vehicle identifying device.

2. A holder for the reception and selective shielding of an electronic vehicle identifying device according to claim 1, wherein said holder includes attachment means for mounting to a vehicle.

3. A holder for the reception and selective shielding of an electronic vehicle identifying device according to claim 2, wherein said attachment means mounts to a vehicle windshield.

4. A holder for the reception and selective shielding of an electronic vehicle identifying device according to claim 2, wherein said attachment means mounts to a vehicle visor.

5. A holder for the reception and selective shielding of an electronic vehicle identifying device according to claim 1, wherein said holder is carried by a vehicle visor.

6. A holder for the reception and selective shielding of an electronic vehicle identifying device according to claim 1, wherein said housing includes first and second members, said first member being a drawer and said second member being an enclosure for the reciprocal movement of said drawer within said enclosure between said first and second positions, said enclosure providing said shielding material portion to electronically shield the vehicle identifying device when said drawer is manually moved to said first position.

7. A holder for the reception and selective shielding of an electronic vehicle identifying device according to claim 6, wherein said enclosure is formed of a plastic having shielding properties.

8. A holder for the reception and selective shielding of an electronic vehicle identifying device according to claim 6, further including stop means between said drawer and enclosure to define the end limits of said first and second positions.

9. A holder for the reception and selective shielding of an electronic vehicle identifying device according to claim 2, wherein said housing includes first and second members, said first member being stationary, and adapted to retain the vehicle identifying device, said second member being a shield for reciprocal movement relative to said first member between said first and second positions.

10. A holder for the reception and selective shielding of an electronic vehicle identifying device according to claim 9, wherein said shield is planar.

11. A holder for the reception and selective shielding of an electronic vehicle identifying transmitter, comprising:

first and second housing members, said second housing member being a drawer for slidable engagement with said first housing member, said drawer adapted to retain the vehicle identifying transmitter and movable between a first position, substantially completely within said first housing member, and a second position extending outward of said first housing member;

at least a portion of said first housing member formed of shielding material to prevent the transmission of electronic signals outward of said holder when said drawer is in its second position, and permitting the transmission of electronic signals outward of said holder when said drawer is in its first position; and means for manually moving said drawer between its first and second positions;

whereby the transmission of electronic signals from said holder requires said drawer to be manually moved to its second position.

12. A holder for the reception and selective shielding of an electronic vehicle identifying device according to claim 11, wherein said holder includes attachment means for mounting to a vehicle.

13. A holder for the reception and selective shielding of an electronic vehicle identifying device according to claim 12, wherein said attachment means mounts to a vehicle windshield.

14. A holder for the reception and selective shielding of an electronic vehicle identifying device according to claim 11, wherein said first housing member is formed of a plastic having shielding properties.

15. A holder for the reception and selective shielding of an electronic vehicle identifying device according to claim 11, further including stop means between said first and second housing members to define the end limits of said first and second positions.

* * * * *

UNITED STATES PATENT AND TRADEMARK OFFICE
CERTIFICATE OF CORRECTION

Page 1 of 1

PATENT NO. : 6,127,938
DATED : October 3, 2000
INVENTOR(S) : Friedman, Solomon

It is certified that error appears in the above-identified patent and that said Letters Patent is hereby corrected as shown below:

<u>Column 7,</u>
Line 17, change "second" to -- first --; and
Line 19, change "first" to -- second --.

Signed and Sealed this

Thirtieth Day of April, 2002

Attest:

Attesting Officer

JAMES E. ROGAN
Director of the United States Patent and Trademark Office